April 18, 1933.  W. F. GOEHRING  1,903,993
CLUTCH
Filed Jan. 14, 1931   3 Sheets-Sheet 1

Inventor
W. F. Goehring
By Clarence A. O'Brien
Attorney

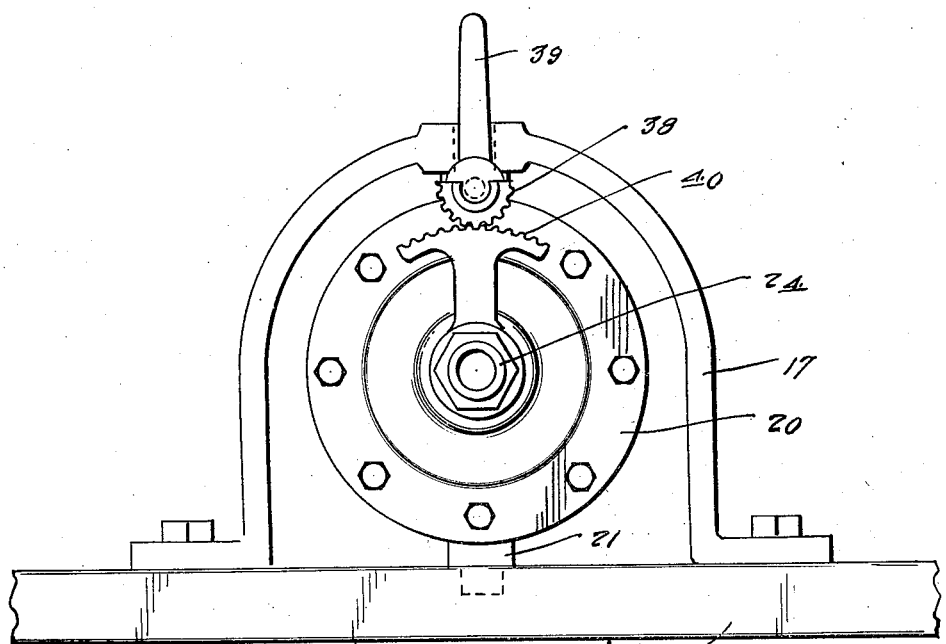
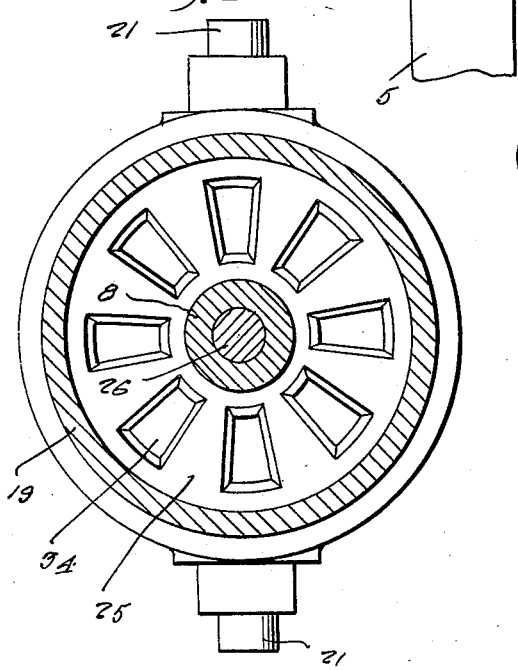
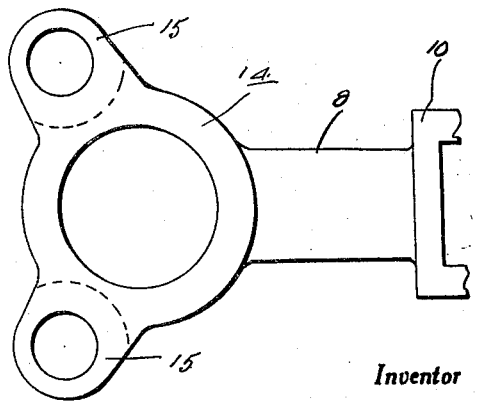

April 18, 1933.                    W. F. GOEHRING                    1,903,993
                                      CLUTCH
                                Filed Jan. 14, 1931           3 Sheets-Sheet 3
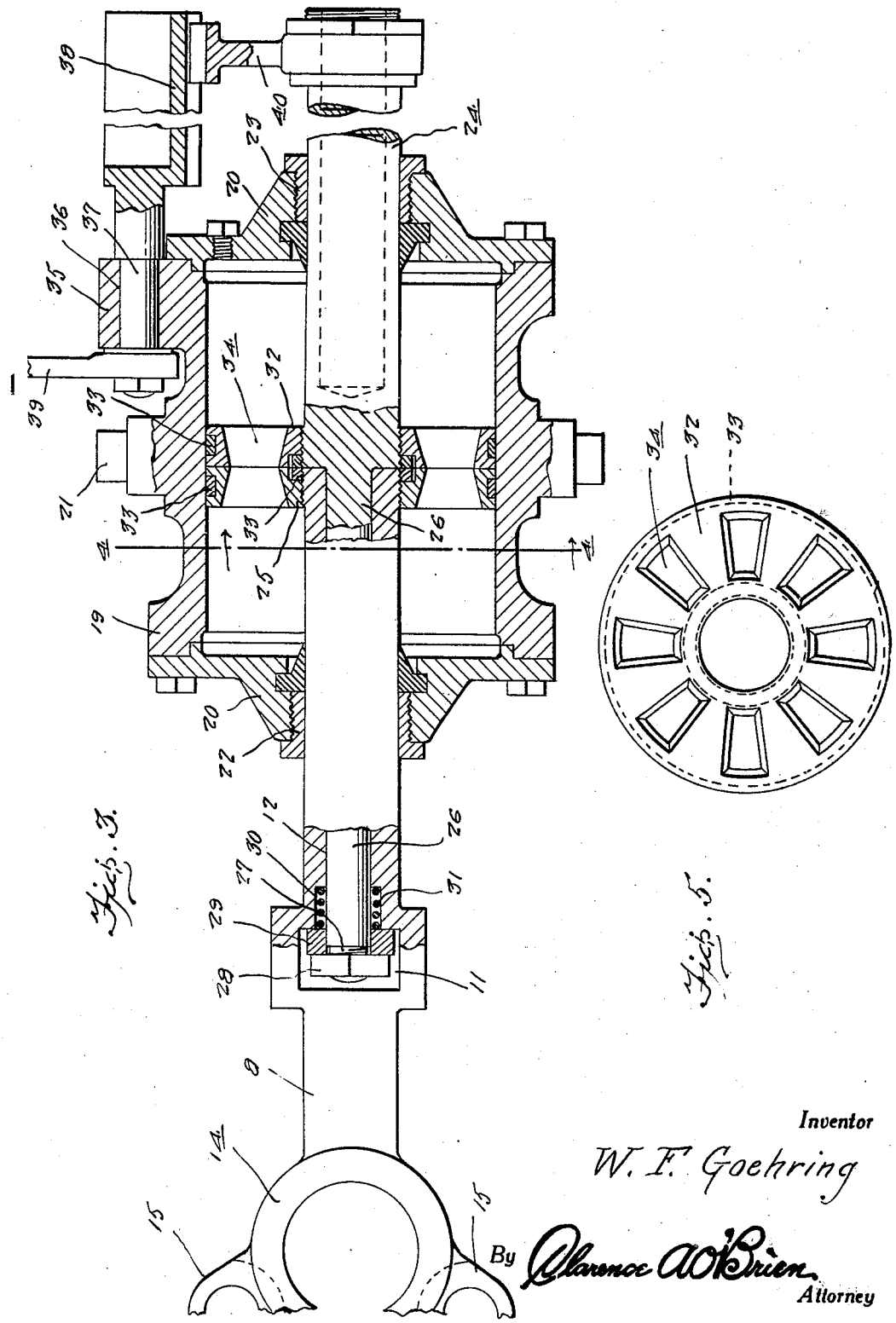
Inventor
W. F. Goehring
By Clarence A. O'Brien
Attorney Patented Apr. 18, 1933

1,903,993

UNITED STATES PATENT OFFICE

WILLIAM F. GOEHRING, OF BALTIMORE, MARYLAND

CLUTCH

Application filed January 14, 1931. Serial No. 508,763.

This invention appertains to new and useful improvements in clutches, and more particularly to a clutch of the fluid type.

The principal object of this invention is to provide a fluid controlled clutch of positive operation.

Another important object of the invention is to provide a clutch combined with a fly wheel and particularly adapted for use on automobiles and aircraft engines.

These and other important objects and advantages of the invention will become apparent to the reader of the following specification and claims.

In the drawings:—

Fig. 2 represents an edge elevational view of the fly wheel looking from the position 2—2 of Fig. 1.

Fig. 3 represents a fragmentary longitudinal sectional view through one of the fluid pump units.

Fig. 4 represents a sectional view taken substantially on the line 4—4 of Fig. 3.

Fig. 5 represents a side elevational view of one of the piston plates.

Fig. 6 represents a fragmentary side elevational view of one of the connecting rods.

Figure 1:
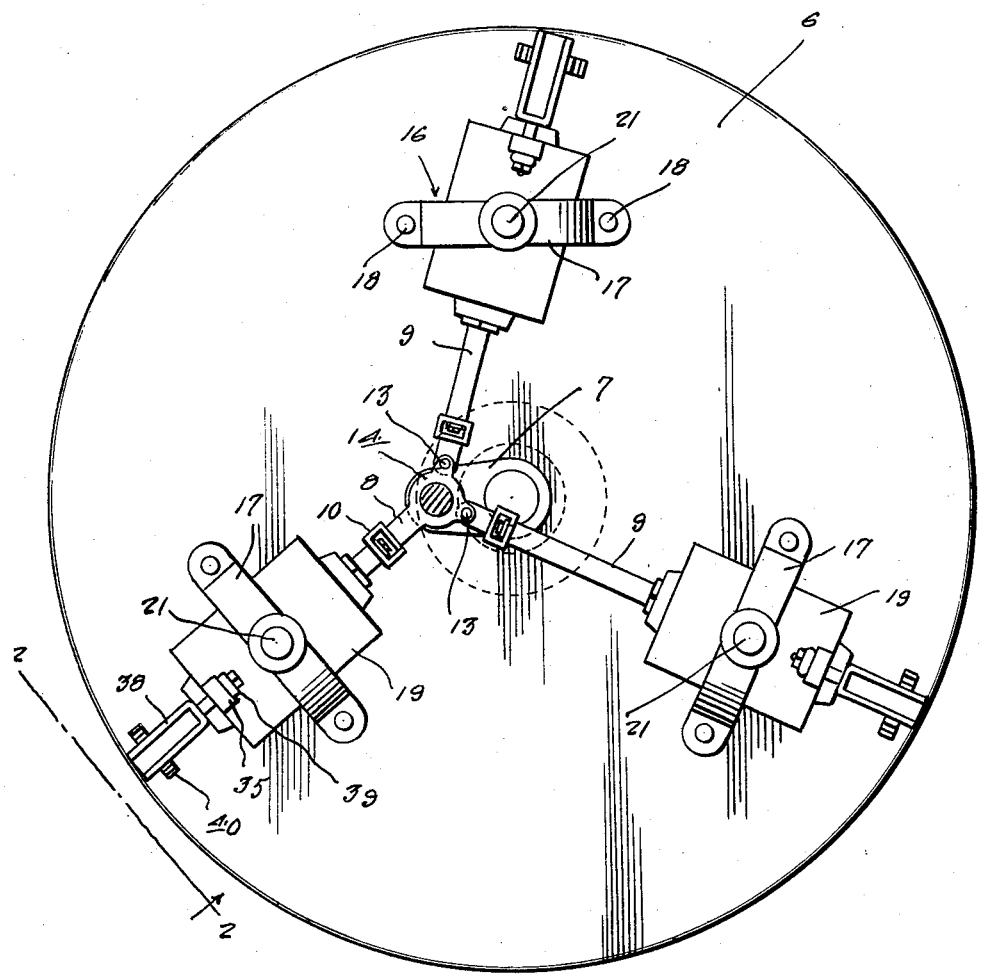
Figure 1 represents a side elevational view of the mechanism.

Referring to the drawings wherein like numerals designate like parts, it can be seen that numeral 5 represents the drive shaft connected to the fly wheel 6.

Fig. 1 shows the crank 7 on the driven shaft (the latter not being shown) and connected to the crank 7 is the master connecting rod 8 and the servient connecting rods 9—9. Each of these connecting rods is provided with an enlarged intermediate portion 10 having an opening 11 therein. From this point in each connecting rod extends a bore 12 which terminates at the outer end of the rod.

The rods 9—9 are pivotally connected as at 13 to the annulus 14 of the master rod 8 at the ears 15.

For each of the rods 8 and 9—9 is a fluid unit 16, consisting of the U-shaped frame 17 secured at its ends to the aforementioned fly wheel 6 as at 18. A cylinder 19 provided with removable headers 20 is provided with diametrically opposed trunnions 21 for engaging into corresponding bearings in the frame 17 and fly wheel 6. The header 20 at one end of the cylinder, is provided with a packing gland 22 for receiving the connecting rod 8, while the header 20 at the opposite end of the cylinder is provided with a packing gland 23 for receiving the shaft 24. The end of the rod 8 or rods 9—9, terminating within its corresponding cylinder 19 is provided with threads for engagement into the piston plate 25. The shaft 24 is provided with an elongated reduced shaft portion 26 which is mounted for disposition through the bore 12. The reduced shaft extension 26 is provided with threads 27 and projects into the opening 11 of the enlarged intermediate portion of the connecting rod. The nuts 28 and 29 engage onto the threaded portion 27 of the shaft extension at this point, and a pocket 30 is provided in the connecting rod at this point to accommodate the coiled spring 31 which impinges against the nut 29 for maintaining the shaft 24 and rod 8 in abutting relation at their adjacent ends, so that the piston plates will always be in snug relation to each other.

The end of the shaft 24 within the cylinder 19 is also provided with threads for disposition into the corresponding piston plate 32. These piston plates 25 and 32 are provided with suitable packing means 33.

Provided in the plates 25 and 32 are radially disposed openings 34 which normally register to permit fluid to pass readily therethrough. It is to be understood that the cylinders 19 are to contain a sufficient amount of fluid for practical operation.

On each of the cylinders 19 is a boss 35 having a bore 36 therethrough for receiving the shaft 37, which is provided with a segmental gear 38 at one end and with an operative lever 39 at its opposite end. The gear 38 meshes with the segmental gear 40 on the shaft 24. It can now be seen, that normally, as the fly wheel 6 and drive shaft 5, rotate, the piston plates 25 and 32 reciprocate in their respective cylinders, thus permitting the crank 7 and driven shaft to remain perfectly stationary.

However, by manually operating the lever 39, of each fluid unit, the plate 32 will be rotated so that the ports 34 will not register with the corresponding ports of the piston plate 25. Thus fluid is prevented from passing through the piston and obviously, the connecting rods are locked against reciprocatory motion. Let it be assumed that the fly wheel 6 is in motion and that the openings 34 in the piston plates 25 and 32 are in registry, in which instance, the fluid content of the individual cylinders will exert no pressure upon the piston. Consequently, there is no exertion on the crank of the driven shaft. When the engine (not shown) is idling, obviously the fly wheel is traveling very slowly and when it is desired to operate the clutch, the levers 39 can be tapped by some handy instrument or if desired, can be hit by the hand so that the plates 32 will be rotated thereby closing the openings 34. In this manner, the fluid in the cylinders is interrupted in its free circulation from one side of the piston to the other.

Obviously, this locks the fly wheel to the driven shaft as the pistons cannot give and results in the turning of the driven shaft with the fly wheel. It will be observed, that the levers 39 extend outwardly in the general direction of the driven shaft, so that by holding an instrument close to the fly wheel 6 as the same is rotating slowly at idle speed, the levers 29 will successively strike the instrument, whereby the levers are moved to operate the piston plates 32.

While the foregoing specification sets forth the invention in specific terms, it is to be understood that numerous changes in the shape, size, and materials may be resorted to without departing from the spirit and scope of the invention as claimed hereinafter.

Having thus described my invention, what I claim as new is:—

1. A clutch of the character described comprising a driven shaft crank, a fly wheel for the usual drive shaft, a plurality of cylinders swingably mounted on one side of the fly wheel, pistons operative in the cylinders, each of said pistons being divided into a pair of plates, one plate of each piston being connected to the aforementioned driven shaft crank, a shaft projecting from the remaining plate of each piston to a point exteriorly of the corresponding cylinder, a laterally disposed lever operatively connected to the outer end of each piston plate shaft extending in a direction away from the fly wheel, said piston plates being provided with registrable openings therein.

2. A clutch of the character described comprising a driven shaft crank, a fly wheel for the usual drive shaft, a plurality of cylinders swingably mounted on one side of the fly wheel, pistons operative in the cylinders, each of said pistons being divided into a pair of plates, one plate of each piston being connected to the aforementioned driven shaft crank, a shaft projecting from the remaining plate of each piston to a point exteriorly of the corresponding cylinder, a laterally disposed lever operatively connected to the outer end of each piston plate shaft extending in a direction away from the fly wheel, said piston plates being provided with registrable openings therein, and spring means associated with the last-mentioned piston plate for maintaining the same snugly against its complementary plate.

3. A clutch of the character described comprising a driven shaft crank, a fly wheel for the usual drive shaft, a plurality of cylinders swingably mounted on one side of the fly wheel, pistons operative in the cylinders, each of said pistons being divided into a pair of plates, one plate of each piston being connected to the aforementioned driven shaft crank, a shaft projecting from the remaining plate of each piston to a point exteriorly of the corresponding cylinder, a laterally disposed lever operatively connected to the outer end of each piston plate shaft extending in a direction away from the fly wheel, said piston plates being provided with registrable openings therein, the last-mentioned piston plate being rotatable, while its complementary plate is non-rotatable and guide extensions on the rotatable plates for disposition into axial openings in the complementary non-rotating plates.

4. A clutch of the character described comprising a driven shaft crank, a fly wheel for the usual drive shaft, a plurality of cylinders swingably mounted on one side of the fly wheel, pistons operative in the cylinders, said pistons each comprising a pair of plates each provided with openings, a connecting rod between one plate of each piston and the crank, each connecting rod having a bore through a substantial portion thereof, the remaining plate of each piston being provided with a shaft extension terminating exteriorly of the corresponding cylinder, a laterally disposed lever operatively connected to each shaft, said plate shaft being provided with a reduced extension at its inner end for disposition through the bore in the connecting rod, and a compressible spring between the extension and the connecting rod for maintaining the piston plates urged snugly together.

In testimony whereof I affix my signature.

WILLIAM F. GOEHRING.